United States Patent
Guo et al.

(10) Patent No.: US 12,506,545 B2
(45) Date of Patent: Dec. 23, 2025

(54) ADAPTIVE MACHINE LEARNING FOR DYNAMIC WIRELESS COMMUNICATION CONFIGURATION

(71) Applicant: NETGEAR, INC., San Jose, CA (US)

(72) Inventors: Chunyi Guo, San Jose, CA (US); Yu-Te Lin, Kaohsiung (TW)

(73) Assignee: NETGEAR, INC., San Jose, CA (US)

( * ) Notice: Subject to any disclaimer, the term of this patent is extended or adjusted under 35 U.S.C. 154(b) by 504 days.

(21) Appl. No.: 18/145,652

(22) Filed: Dec. 22, 2022

(65) Prior Publication Data
US 2024/0214079 A1 Jun. 27, 2024

(51) Int. Cl.
| | |
|---|---|
| H04L 5/00 | (2006.01) |
| H04B 17/00 | (2015.01) |
| H04B 17/15 | (2015.01) |
| H04L 25/02 | (2006.01) |

(52) U.S. Cl.
CPC ......... *H04B 17/0085* (2013.01); *H04B 17/15* (2015.01); *H04L 25/0204* (2013.01)

(58) Field of Classification Search
CPC .. H04B 17/0085; H04B 17/15; H04B 17/318; H04L 25/0204; H04L 5/00; H04L 5/14
See application file for complete search history.

(56) References Cited

U.S. PATENT DOCUMENTS

| | | | |
|---|---|---|---|
| 10,362,502 B2* | 7/2019 | Van Doorselaer | H04L 43/0888 |
| 2017/0054612 A1* | 2/2017 | Yi | H04L 43/0847 |
| 2024/0069099 A1* | 2/2024 | Sommers | G01R 31/31905 |
| 2024/0095456 A1* | 3/2024 | Santhar | G06F 40/20 |
| 2024/0198064 A1* | 6/2024 | Blain Christen | A61M 27/006 |

* cited by examiner

*Primary Examiner* — Lan-Huong Truong
(74) *Attorney, Agent, or Firm* — PERKINS COIE LLP (57) ABSTRACT

A method includes obtaining a set of wireless statistics of a wireless communication device and a set of hardware-related information of the wireless communication device. The method further includes determining a set of test results of a testbed system based on the set of wireless statistics and the set of hardware-related information by configuring the testbed system based on the set of wireless statistics and the set of hardware-related information. The method further includes updating a set of decision parameters of a wireless configuration decision model using a machine learning model based on the set of test results. The method further includes sending the updated set of decision parameters to the wireless communication device, wherein the wireless communication device configures a wireless configuration parameter based on an instance of the wireless configuration decision model configured with the updated set of decision parameters.

20 Claims, 5 Drawing Sheets

ADAPTIVE MACHINE LEARNING FOR DYNAMIC WIRELESS COMMUNICATION CONFIGURATION

BACKGROUND

A wireless communication network may include various types of wireless communication devices, such as routers, switches, or user equipment (UE). These wireless communication devices may communicate over multiple channels, where different channels may be associated with different data types or allocated to different applications or types of applications. As the amount of participants in a wireless network changes over time or as physical device positions change, a wireless communication device may select a new channel to ensure continued robust network performance.

SUMMARY

A wireless communication device may be forced to operate under various types of real-world conditions that encourage the use of multiple channels to convey information. The physical topology of an environment may create physical barriers, or the amount of other wireless communications in an area may make a particular channel too noisy to use, etc. In many cases, a wireless device may increase application effectiveness and communication reliability by using channel-switching operations to select a new channel in response to certain criteria. However, many conventional channel selection algorithms are designed in a laboratory environment and may be sub-optimal in real-world environments.

Some embodiments may use a machine learning architecture to improve wireless network quality, stability, or performance. Some embodiments may obtain data from a wireless communication device over a duration and determine a set of wireless statistics associated with the wireless communication device. For example, some embodiments may obtain a set of wireless statistics such as a signal strength value. Some embodiments may also obtain a set of device usage information associated with the first mobile wireless communication device. For example, some embodiments may obtain a set of device usage information, such as application usage data from the wireless communication device. Furthermore, some embodiments may also obtain a set of hardware-related information associated with the wireless communication device. For example, some embodiments may obtain a set of hardware-related information that includes an antenna usage value of a wireless communication device. Some embodiments may use the set of device usage information and hardware-related information to emulate device performance in a testbed by configuring a transmitting or receiving device of the testbed to emulate hardware components based on the hardware-related information and application performance based on application usage data or other device usage information. During a testing operation, some embodiments may modify operations of the Wi-Fi testbed to simulate signal emission or reception of the test device to simulate signal performance indicated by the signal strength value, signal metrics, or other device usage information.

After obtaining test results from a testbed, some embodiments may determine a set of decision parameters for a wireless configuration decision model based on the test results. In some embodiments, determining the set of decision parameters may include performing training operations with a machine learning model. Some embodiments may obtain multiple sets of hardware-related information and device usage information to perform the training operation. The set of decision parameters may include machine learning model parameters (learning model parameters) for a machine learning model, such as neural network weights, decision tree weights, etc. Some embodiments may then send the set of decision parameters to a set of wireless communication devices, where the set of wireless communication devices may include devices that provide the hardware-related data or device usage information for the training operation or other operations to determine a decision parameter. Once a wireless communication device receives the set of decision parameters, the wireless communication device may update a wireless configuration decision model with the received set of decision parameters and use the updated wireless configuration decision model to select a channel dynamically.

Various other aspects, features, and advantages of the invention will be apparent through the detailed description of the invention and the drawings attached hereto. It is also to be understood that both the foregoing general description and the following detailed description are examples, and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion," refers to a part of, or the entirety of (i.e., the entire portion), a given item (e.g., data) unless the context clearly dictates otherwise. Furthermore, a "set" may refer to a singular form or a plural form, such as that a "set of items" may refer to one item or a plurality of items.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art, that the embodiments of the invention may be practiced without these specific details or with an equivalent arrangement. In other cases, well-known structures and devices are shown in block diagram form in order to avoid unnecessarily obscuring the embodiments of the invention.

Various wireless communication devices implement wireless configuration decision models to adjust wireless connections with other wireless communication devices. A wireless configuration decision model may include various types of models, such as a channel selection model that is used to select one or more channels for wireless communication. The wireless configuration decision model may take into account various types of wireless environmental information, device usage information, geographic information, temporal information, organization-specific information, or other information. In many cases, the wireless configuration decision model may include a channel selection model that selects which channels to use for serving a wireless connection.

Environmental changes, technological improvements, or application use changes may decrease the effectiveness of a channel selection model or another type of wireless configuration decision model. Updating a static wireless configuration decision model via manual methods is significantly hindered by the near-unlimited permutations of conditions under which wireless communication may occur. Different types of devices have different power outputs, different types of antennas, etc. Furthermore, even very similar devices may be placed or moved to dramatically different environments, where different channels may have different types of effectiveness.

To overcome such obstacles or other challenges, some embodiments may use a machine learning model to update a wireless configuration decision model. Some embodiments may collect various types of data from wireless communication devices, generate test results by using some or all of the collected data to configure operations of a testbed system and provide the collected data and test results to a machine learning model. The machine learning model may use the provided information to determine a set of parameters of a wireless configuration decision model. Some embodiments may then distribute the set of parameters to wireless communication devices, where the wireless communication devices may update a local instance of the wireless configuration decision model. The wireless communication devices may use the updated instances to more effectively serve wireless connections, perform uplink selection for network topology applications, or optimize communication parameters for user-specific activities. A wireless configuration decision model updated by a machine learning model may result in more efficient or higher-throughput communication between wireless devices adaptable to different environments.

Figure 1:
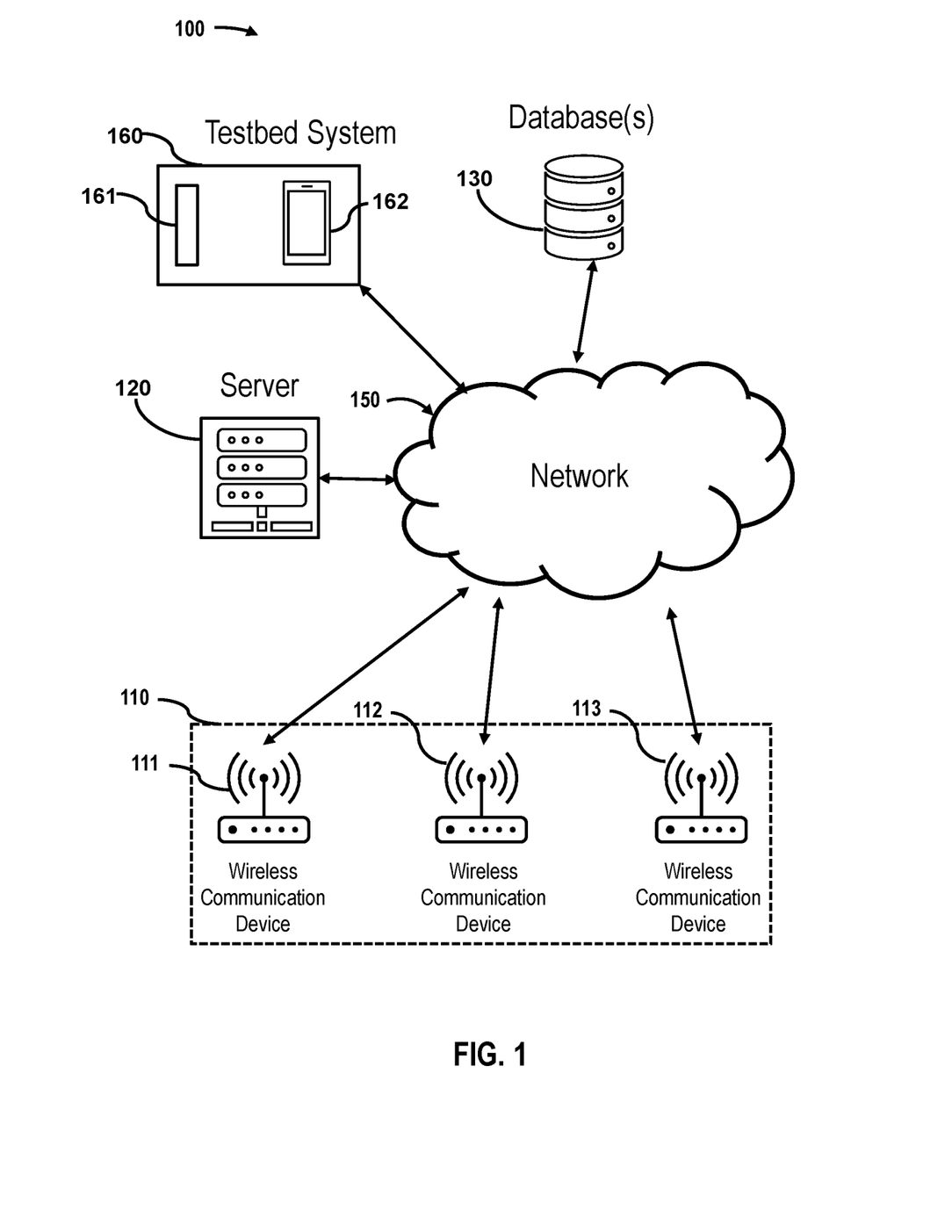
FIG. 1 shows an example system for updating a wireless configuration decision model, in accordance with one or more embodiments.

FIG. 1 shows an example system for updating a wireless configuration decision model, in accordance with one or more embodiments. A system 100 includes a set of wireless communication devices 110, which includes a first wireless communication device 111 and a second wireless communication device 112. While each respective wireless communication device of the wireless communication devices 111-112 is shown as an access point (AP), the set of wireless communication devices 110 may include other types of wireless communication devices such as a desktop computer, a wearable headset, a router, etc. In some embodiments, the set of wireless communication devices 110 may communicate with various other computing devices via a network 150, where the network 150 may include the Internet, a local area network, a peer-to-peer network, etc.

One or more devices of the set of wireless communication devices may send and receive messages through the network 150 to communicate data with a server 120. The set of wireless communication devices 102 may send wireless statistics, device usage data, and hardware-related information to the server 120 to update a wireless configuration decision model. The server 120 may aggregate the data and perform a set of operations to update a dynamic wireless configuration decision model. The operations may include sending some or all of the collected data to a testbed system 160. In some embodiments, the testbed system 160 may include a testbed transmitting device 161 capable of emitting different wireless signals and a testbed receiving device 162. Alternatively, or additionally, the testbed system 160 may include a device emulation application capable of emulating different types of wireless devices and different wireless communication environments.

After receiving aggregated data, the testbed system 160 may perform operations to generate a plurality of test results indicating actual or simulated device performance under different conditions. For example, some embodiments may configure transmitting device parameters of the testbed receiving device 162 to mimic the hardware capabilities and configuration of the first wireless communication device 111 and to emulate device usage based on application usage data provided by the first wireless communication device 111. Some embodiments may modify the set of receiving device parameters of the testbed transmitting device 161 based on signal strength information or other wireless metrics provided by the first wireless communication device 111 to mimic a wireless environment experienced by the first wireless communication device 111.

The server 120 may include a set of non-transitory storage media storing program instructions to perform one or more operations described in this disclosure. Further, while one or more operations are described herein as being performed by particular components of the system 100, those operations may be performed by other components of the system 100 in some embodiments. For example, one or more operations described in this disclosure as being performed by the server 120 may instead be performed by the first wireless communication device 111, the second wireless communication device 112, etc. For example, the first wireless communication device 111 may collect hardware-related data and device usage information from other user devices and then send some or all of the collected data to the testbed system 160 for actual or simulated wireless operations. In some embodiments, the first and second wireless communication devices 111-112 may form or be part of a mesh network, where a wireless configuration decision model may be used to determine an uplink order or other topology-related configurations of the mesh network.

In some embodiments, a memory of the first wireless communication device 111, of the second wireless communication device 112, or of another computing device may be used to store program instructions for applications, machine learning models, received learning model parameters, or other learning results from wireless communication devices, test data, or other data described in this disclosure. In addition, although some embodiments are described herein with respect to neural network models, other prediction models may be used instead of or in addition to the neural network models. For example, a probabilistic model may be used to replace a neural network model in one or more embodiments to determine whether an input satisfies an objective or not. For example, the server 120 may send, to a wireless communication device, a decision parameter identifying a specific subset of trees of a random forest model. The wireless communication device may then perform a set of learning operations that causes the wireless communication device to update learning model parameters of the specific subset of trees and send the updated learning model parameters back to the server.

In some embodiments, the set of computer systems and subsystems illustrated in FIG. 1 may include one or more computing devices having electronic storage or being otherwise capable of accessing electronic storage, where the electronic storage may include a set of databases 130. The set of databases 130 may include various values used to perform operations described in this disclosure, such as test data, aggregated learning model parameters, individual learning model parameters received from different computing devices, hyperparameters for machine learning models, other values used in this disclosure, etc.

Figure 2:
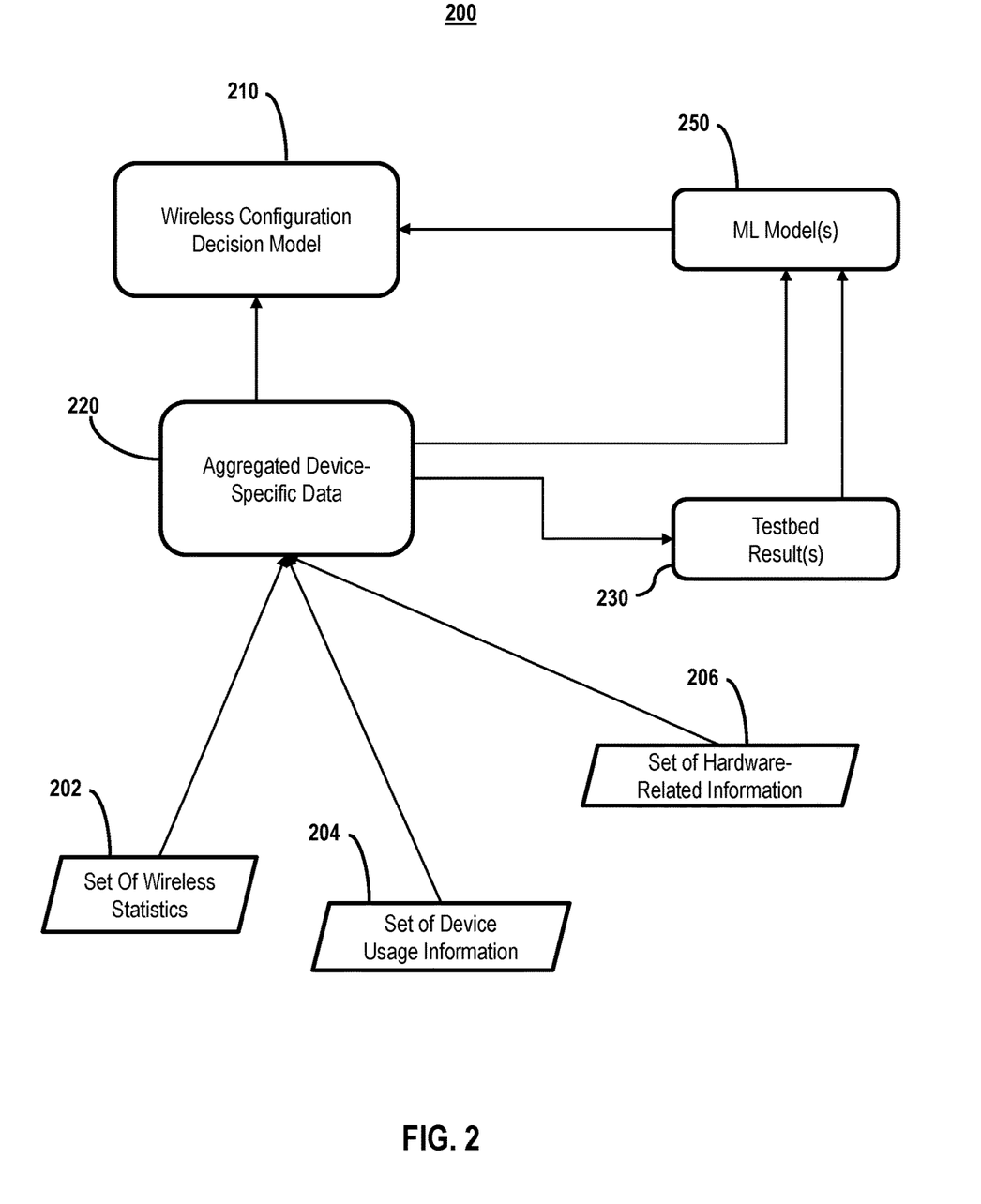
FIG. 2 shows an illustrative data architecture for updating a wireless configuration decision model, in accordance with one or more embodiments.

FIG. 2 shows an illustrative data architecture for updating a wireless configuration decision model, in accordance with one or more embodiments. The data architecture 200 indicates that a set of wireless statistics 202, a set of device usage information 204, and a set of hardware-related information 206 may be received from a wireless communication device, such as a cellular phone, laptop, wearable computing device, router, etc. The received data may be collected as aggregated device-specific data 220. The aggregated device-specific data 220 may store data collected over time from a wireless communication device. Some embodiments may send some or all of the aggregated device-specific data 220 to a testbed system to generate a plurality of test results 230.

Some embodiments may generate the test results 230 by configuring parameters of a testbed system to generate signals and emulate device behavior. The generated signals or emulated device behaviors may mimic those signals or behaviors characterized by the wireless statistics provided by a wireless communication device, device usage information provided by the wireless communication device, or hardware-related information associated with the wireless communication device.

As described elsewhere in this disclosure, a test result of the test results 230 may include wireless statistics, such as a Received Signal Strength Indicator (RSSI). In some embodiments, the test results 230 may include information of a type that was not provided by a wireless communication device. For example, the test results 230 provided by a testbed system may include a signal-to-noise ratio (SNR) after the testbed system is configured with data provided by a wireless communication device, where the wireless communication device did not provide an SNR. Alternatively, or additionally, some embodiments may also generate one or more test results that include variations of provided data. For example, some embodiments may generate a first testbed result by using a testbed transmitting device to send signals characterized by a set of wireless statistics sent by a wireless communication device. In some embodiments, the signals are received by a testbed receiving device configured to emulate the wireless communication device based on a set of hardware-related information associated with the wireless medication device. Some embodiments may then modify a configuration of the testbed receiving device or the testbed transmitting device to change a selected channel and determine a second test result after performing a test based on the modified set of testbed parameters.

In some embodiments, the set of test results 230 may include test results for some or all of the sets of data associated with a corresponding set of timepoints. For example, a wireless communication device may provide a first set of wireless statistics measured at a first timepoint and a second set of wireless statistics measured at a second timepoint. Some embodiments may perform testing operations based on these received measurements such that the set of test results 230 includes a first test result corresponding with the first timepoint and a second test result corresponding with the second timepoint.

After determining test results, some embodiments may provide the set of test results 230 and the aggregated device-specific data 220 to a set of machine learning models 250. The set of machine learning models 250 may include a single machine learning model or may include different machine learning models corresponding with different conditions or other criteria. Some embodiments may train the set of machine learning models 250 to determine a wireless configuration decision model 210. For example, the set of machine learning models 250 may include a neural network model trained to determine a set of decision model parameters characterizing the wireless configuration decision model 210.

Some embodiments may obtain a history of wireless communication measurements and use the history of wireless communication values for training operations. The history of wireless communication measurements may include information such as the set of wireless statistics 202, the set of device usage information 204, or the set of hardware-related information 206. In some embodiments, different subsets of information may be associated with different timestamps or other indications of time such that a machine learning model may be trained to determine decision parameters based on changes in values over time.

Some embodiments may use a wireless configuration decision model 210 to predict various types of measurements related to wireless communications and determine one or more outcomes based on the predicted measurements. For example, some embodiments may use the wireless configuration decision model 210 to predict an RSSI based on other wireless statistics or other data provided by a set of wireless communication devices. Some embodiments may then compare the predicted value with a test result of the set of test results 230. Some embodiments may use the difference between the predicted value and the test result to update one or more learning model parameters of the set of machine learning models 250. Some embodiments may then update the decision parameters of the wireless configuration decision model 210 and repeat this process until the accuracy of the wireless configuration decision model 210 satisfies a set of criteria.

After determining that the wireless configuration decision model 210 satisfies a set of criteria after being updated, some embodiments may then distribute the wireless configuration decision model 210 to one or more wireless communication devices. Some embodiments may send numeric values, text, program code, or other types of data representing a wireless configuration decision model 210 to a wireless communication device. Alternatively, some embodiments may send only the updated decision parameters of the wireless configuration decision model 210 to the wireless communication device. After receiving a new wireless configuration decision model, a wireless communication device may update a local instance of a wireless configuration decision model by generating a new instance of the wireless configuration decision model. Alternatively, after receiving an updated set of decision parameters, a wireless communication device may update a local instance of a wireless configuration decision model by modifying the parameters of the local instance by replacing an initial set of decision parameters with the updated set of decision parameters.

Figure 3:
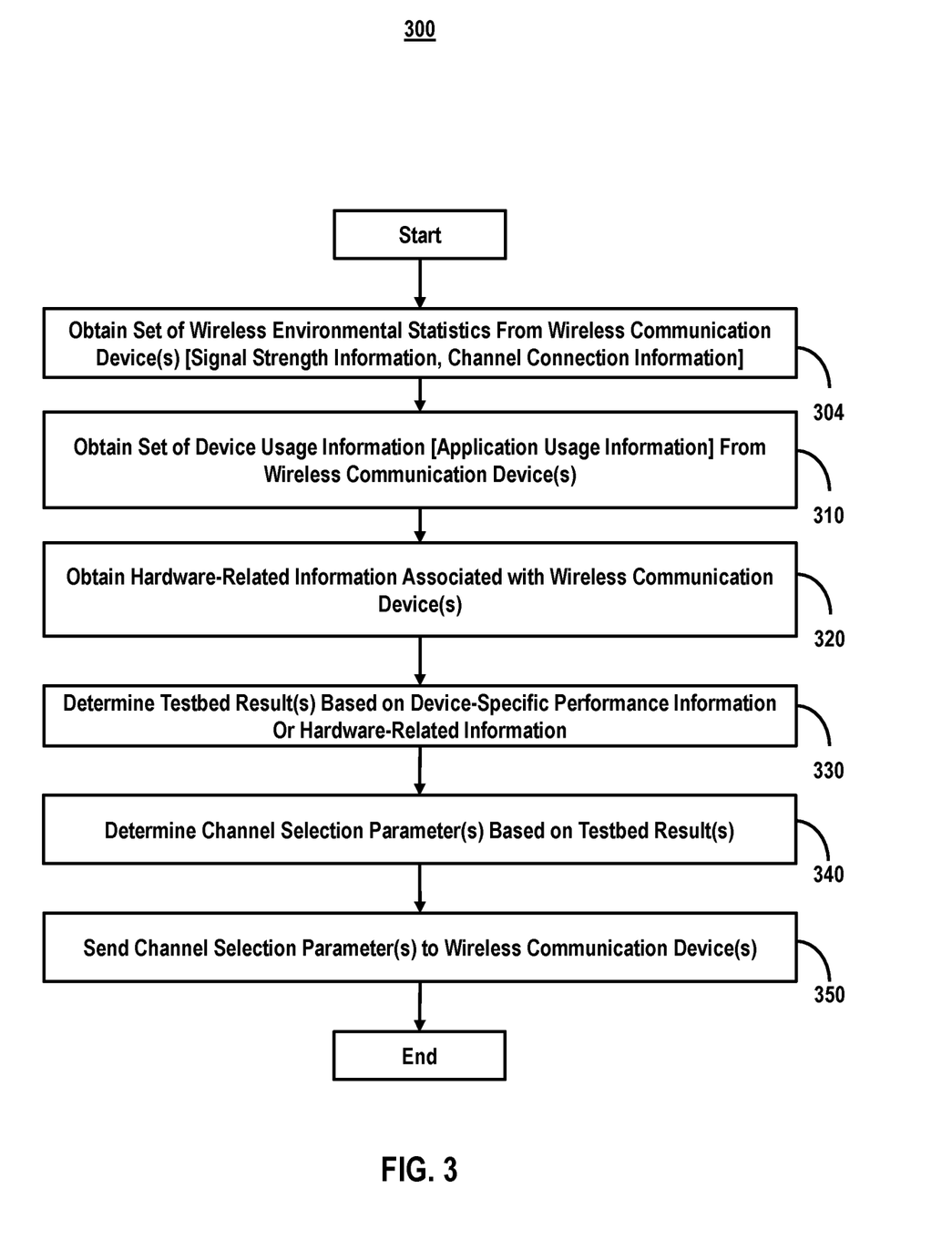
FIG. 3 shows a flowchart of a process to update a wireless configuration decision model based on test results and information provided by a set of wireless communication devices, in accordance with one or more embodiments.

FIG. 4 shows a flowchart of a process to update a wireless configuration decision model using a machine learning model, in accordance with one or more embodiments. Some embodiments may obtain a set of wireless statistics from a set of wireless communication devices, as indicated by block 304. The set of wireless statistics may include signal strength values, such as an RSSI, or other types of wireless runtime statistics. The set of wireless statistics may include other types of statistics, such as a measure of throughput data from clients or a backhaul network. For example, some embodiments may obtain throughput data that was measured by a wireless communication device using the "pktgen" testing tool.

Some embodiments may obtain a plurality of wireless statistics corresponding with different timepoints in a set of timepoints, where each timepoint may represent an instant, a duration in time, etc. For example, a wireless communication device may record a first RSSI at a first time and a second RSSI at a second time. Some embodiments may then receive the first and second RSSIs from the wireless communication device. Furthermore, the wireless statistics provided by a wireless communication device may include information associated with other devices connected to the wireless communication device. For example, the wireless statistics provided by a wireless communication device may include RSSI data provided by a cell phone, tablet, or another mobile computing device.

Some embodiments may obtain a set of device usage information from the set of wireless communication devices, as indicated by block 310. The set of device usage information may indicate or characterize how a user uses a device or how one or more applications operating on a device uses the device. A wireless communication device may convey device usage information, such as application types that a user is using which send or receive information via the wireless communication device. Alternatively, or additionally, the wireless communication device may convey other application-specific information, such as the specific applications being used by the device, the specific applications that are using the device to communicate information, etc. Some embodiments may also convey other types of information related to how a user uses the wireless communication device, such as a peak time of use, a peak duration of use, or a set of idle times.

Some embodiments may obtain a plurality of device usage information corresponding with different timepoints in a set of timepoints in time or durations in time. For example, a wireless communication device may record a first application usage value indicating an application type being used at a first timepoint and a second application usage value indicating a second application type being used at a second timepoint. The first timepoint and the second timepoint may be shared with an associated plurality of RSSI values, another plurality of signal strength values, or another plurality of wireless statistics. Some embodiments may then receive the first and second RSSIs from the wireless communication device and the first and second application usage values from the wireless communication device, where both the RSSI and application usage values are associated with the same timepoints.

Some embodiments may obtain a set of hardware-related information associated with the set of wireless communication devices, as indicated by block 320. Some embodiments may obtain the set of hardware-related information directly from a corresponding set of wireless communication devices. For example, some embodiments may receive data from a wireless communication device or a mobile computing device that includes hardware-related information, such as the battery power available to a wireless communication device or a mobile computing device, a current amount of battery capacity, a computing resource type or value characterizing computing resource performance, an amount of antenna usage of the wireless communication device or a mobile computing device and antenna type of the wireless communication device or a mobile computing device, a lifetime of the wireless communication device or a mobile computing device, etc. Alternatively, some embodiments may receive an identifier of a device and obtain a set of hardware-related information based on the identifier. For example, some embodiments may receive a device identifier "x0-3-0021" and, in response to receiving the device identifier, access a database to retrieve hardware-related information using the device identifier "x0-3-0021."

Some embodiments may obtain a plurality of hardware-related information corresponding with different timepoints in a set of timepoints. For example, a hardware-related information may record a first antenna usage value indicating a first amount of antenna usage at a first timepoint and a second antenna usage value indicating a second amount of antenna usage associated with a second timepoint. The first timepoint and the second timepoint may be shared with an associated plurality of RSSI values, another plurality of signal strength values, or another plurality of wireless statistics. Furthermore, The first timepoint and the second timepoint may be shared with an associated set of device usage information. For example, some embodiments may receive, from a wireless communication device, first and second RSSIs, first and second application usage values, and first and second antenna usage values from the wireless communication device, where the RSSIs, application usage values, and antenna usage values are associated with the same timepoints.

Some embodiments may determine test results based on the set of wireless statistics, the set of wireless communication devices, or the set of hardware-related information, as indicated by block 330. Some embodiments may use a testbed system to generate test results indicating outcomes of exposing a wireless device to wireless signals. In some embodiments, the testbed system may include a signal-emitting testbed system, where the signal-emitting testbed system may include a testbed transmitting device and a testbed receiving device. In some embodiments, the testbed transmitting device may be configured based on the set of wireless statistics to generate various types of wireless signals having different properties capable of mimicking signals characterized by the set of wireless statistics. For example, some embodiments may configure antenna power output, antenna direction, and activation or deactivation of antennas of an antenna array.

Some embodiments may configure the testbed receiving device to mimic usage similar to or the same as usage characterized by a set of device usage information received from the set of wireless communication devices. For example, some embodiments may obtain data from a wireless communication device indicating that the wireless communication device uses an application associated with the application type of "Type1" or transports data used for an application associated with the application type "Type1." Some embodiments may then cause a testbed receiving device to emulate the execution of the application or emulate resource consumption indicative of the application. Similarly, some embodiments may configure the testbed receiving device to mimic hardware characterized by a set of hardware-related information received from the set of wireless communication devices. For example, after receiving an antenna usage of a wireless communication device, some embodiments may modify hardware configurations of a testbed device to emulate the antenna usage of the wireless communication device. Examples of antenna usage may include indications of specific antenna usage of a multi-antenna device, indications of durations of antenna usage, etc.

Alternatively, or additionally, some embodiments may use a testbed simulation system that includes a set of simulation applications. Some embodiments may execute the set of simulation applications to simulate different wireless environments characterized by the set of wireless statistics received by a set of wireless communication devices. Furthermore, some embodiments may use the set of simulation applications to emulate one or more wireless communication devices based on a set of hardware-related information received from the one or more wireless communication devices. In addition, or alternatively, some embodiments may mimic device usage based on a set of device usage information received from one or more wireless communication devices.

Some embodiments may modify operations of the testbed system to determine a plurality of test results characterizing the effects of changing channels or signal-related conditions. Modifying operations of a testbed system may include reconfiguring a set of testbed parameters. A testbed parameter may control an operation of a testbed transmitting device, a testbed receiving device, or another component of a signal-emitting testbed system. For example, some embodiments may change a channel of a testbed receiving device and determine signal metrics after the change in channel. Alternatively, some embodiments may modify operations of a testbed system by changing a set of simulation parameters of a set of testbed simulation applications. For example, some embodiments may modify a testbed parameter in a simulation application, where the testbed parameter may represent a simulated noise level in a wireless environment, and where the simulation application will then generate a set of test results indicating wireless signal metrics after the simulated noise level has been implemented.

Some embodiments may determine a set of decision parameters using a machine learning model based on the set of test results, as indicated by block 340. Some embodiments may feed data sent from a set of wireless communication devices or test results to a machine learning model to update a wireless model. The machine learning model may use the data to update a wireless configuration decision model by updating the decision parameters of the wireless configuration decision model. Various types of machine learning models may be used, such as a neural network model, support vector machines, a random forest model, etc. Some embodiments may compare predicted outcomes made by the machine learning model with the data sent by a wireless communication device and update parameters of the machine learning model based on differences between the predicted outcomes and the sent data. For example, some embodiments may use a machine learning model to update a wireless configuration decision model and use the updated wireless configuration decision model to predict an RSSI based on other wireless statistics, device usage information, or hardware-related information. Some embodiments may compare the predicted RSSI with an RSSI value sent from a wireless communication device and update the machine learning model based on a difference between the predicted RSSI and the sent RSSI.

Some embodiments may send the set of decision parameters to the set of wireless communication devices, as indicated by block 350. In some embodiments, the set decision parameters may be sent as a set of values representing the parameter values themselves. For example, based on a determination that a first parameter for a wireless configuration decision model is equal to "7," and a second parameter for the wireless configuration decision model is equal to "20," some embodiments may send numeric values "7" and "20." Alternatively, some embodiments may use a pre-defined identifier to represent a value or a plurality of values and send the pre-defined identifier. For example, based on a determination that the first set of wireless configuration decision model parameters is equal to the values in the model parameter array '["3"; "30.1"; "9999"],' some embodiments may send a pre-defined identifier "A" based on a determination that the pre-defined identifier "A" is mapped to the model parameter array.

After sending the set of decision parameters to a wireless communication device, the wireless communication device may update a local instance of the wireless configuration decision model with the set of decision parameters. The wireless communication device may then use the updated model to configure a wireless communication parameter. Configuring a wireless communication parameter may cause various types of changes of wireless communications, such as selecting or changing a channel(s) being used to communicate data, allocating an amount of network resources for an application, setting an uplink order of a mesh network, etc. For example, some embodiments may use a wireless configuration decision model to select a channel from a plurality of channels, where the selected channel may serve a wireless connection. Alternatively, or additionally, the selected channel may be used to determine a communication order of a mesh network topology. For example, some embodiments may use an updated wireless configuration decision model to select uplink channels for two or more wireless devices used to form a mesh network, where the selected channels may determine, for each of the two or more wireless devices, the order in which data is transmitted back to a central communication device.

In some embodiments, a wireless communication device may use the wireless configuration decision model to optimize a wireless configuration based on daily usage, where peak usage times, idle times, or application-specific information. For example, some embodiments may update a channel selection model that better accounts for a user's peak usage hour by selecting high throughput channels for that peak usage hour or selecting a lower throughput channel during an idle time. Alternatively, or additionally, a wireless communication device may use an updated wireless configuration decision model to allocate and optimize a channel for a specific type of application, such as streaming video content, participating in online telecommunications, basic web browsing, etc.

Figure 4:
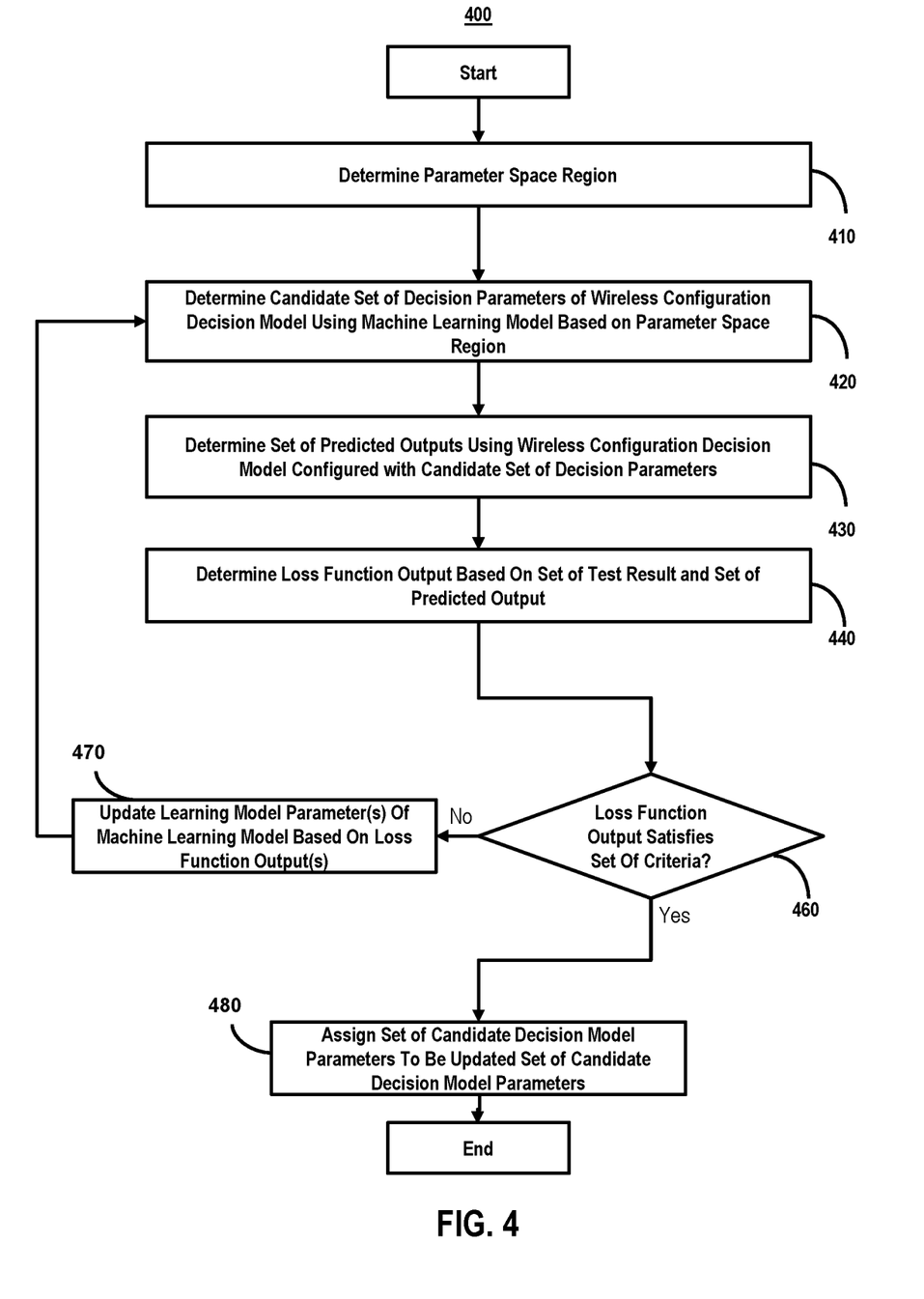
FIG. 4 shows a flowchart of a process to update a wireless configuration decision model using a machine learning model, in accordance with one or more embodiments.

FIG. 4 shows a flowchart of a process to update a wireless configuration decision model using a machine learning model, in accordance with one or more embodiments. Some embodiments may determine a region in a parameter space, as indicated by block 410. The region in the parameter space may be defined by limits of a parameter in a channel selection model. For example, the region in the parameter space may be defined by a first parameter that is limited to values between −1 and +1, and a second parameter that is limited to values between −3 and +10.1. Various other types of regions are possible, where a region may include one or more parameters that are not associated with any limits. As described elsewhere in this disclosure, some embodiments may implement a loss function that increases the likelihood that a candidate set of parameters is within a region in the parameter space or otherwise prevent the candidate set of parameters from being outside the region of a parameter space.

Some embodiments may determine a set of candidate decision parameters using a machine learning model based on the region in the parameter space, as indicated by block 420. The machine learning model may include a neural network model, such as a deep learning neural network that includes multiple layers of neural units, where a deep learning neural network may include neural networks having at least three layers of neural units. For example, some embodiments may use a deep learning neural network unit to predict a set of decision parameters of a wireless configuration decision model used to select a wireless communication channel. The neural network model may include one or more types of neural networks, such as a convolutional neural network, transformer neural network, recurrent neural network, ensemble model, etc. For example, some embodiments may receive, from a wireless communication device, time information such as a sequence of timepoints during which a set of wireless statistics or device usage information is collected. Some embodiments may provide, to a recurrent neural network, this received time information and the associated collected data as inputs to update a set of decision parameters using the recurrent neural network.

Some embodiments may configure a machine learning model based on a known device type or another characteristic of a device. For example, some embodiments may obtain an identifier associated with the wireless communication device, where the wireless communication device may provide the identifier or may provide information that may be used to retrieve the identifier. In some embodiments, the identifier may represent a device type, a use type, a specific device identifier, etc. Some embodiments may retrieve a set of learning parameters of the machine learning model based on the identifier, such as by sending a query to a database including the identifier to retrieve the set of learning parameters from the database. Some embodiments may then determine a modified decision model by configuring a wireless configuration decision model with the retrieved set of learning parameters and determine a first predicted output using the modified decision model.

Some embodiments may determine a set of decision parameters using a channel selection model configured by the set of candidate decision parameters based on a set of wireless statistics, as indicated by block 430. Various types of wireless configuration decision models may be used to determine one or more wireless configuration parameters for wireless communications. For example, a wireless configuration decision model may include a channel selection algorithm, where different devices may use different types or specific implementations of channel selection algorithms. In many cases, a channel selection algorithm or other wireless configuration decision models may vary such that different access points may use different models. Regardless of specific implementations, some embodiments may use a wireless configuration decision model to determine wireless configuration parameters, such as a channel type, an uplink topology, etc.

In order to determine the set of decision parameters, some embodiments may provide, as inputs to a machine learning model, one or more values of a set of wireless statistics, a set of device usage information, and a set of hardware-related information. The machine learning model may receive these inputs and generate a set of outputs that may then be used as updated decision parameters for a wireless configuration decision model. Some embodiments may confine selected parameter values to be values in a region of a parameter space, such as the region in the parameter space discussed for block 410.

Some embodiments may determine a set of predicted outputs using the wireless configuration decision model configured with the set of candidate decision parameters, as indicated by block 430. Some embodiments may use a wireless configuration decision model that has been configured with a set of candidate decision parameters to predict a set of decision model outputs. For example, the wireless configuration decision model may be a channel selection algorithm, and some embodiments may use a set of device usage information or a set of hardware-related information as the channel selection algorithm to predict an RSSI or another wireless statistic based on a set of wireless statistics. Some embodiments may use the channel selection algorithm to predict multiple wireless statistics associated with different combinations of other wireless statistics, device usage information, or hardware-related information. In some embodiments, the channel selection algorithm may then be used to select a channel based on the predicted wireless statistics. For example, some embodiments may use a channel selection algorithm to predict SNR values for a wireless communication device operating in an environment characterized by data provided by the wireless communication device. Some embodiments may then use the predicted SNR values to select a channel that has a greatest SNR value.

Some embodiments may determine whether a loss function output satisfies a threshold, as indicated by block 460. Some embodiments may use a loss function to determine whether a decision model configured with a set of candidate decision parameters is sufficiently accurate. Various types of loss functions may be used, where the operations of the loss function may include addition, subtraction, multiplication, division, exponent operators, conditional statements, etc. While the descriptions of the loss function in this disclosure are written to indicate that a set of decision parameters associated with a greater loss function output will be selected in favor of a set of decision parameters associated with a greater loss function output, it should be understood that designations of lesser and greater may be switched with no loss in generality or applicability to the operations described in this disclosure.

A loss function may be determined as a function that uses data from multiple timepoints. Some embodiments may determine a loss function as a sum of values, where each respective value of the sum of values may be computed from a difference between a decision model output and a test result, and where the decision model output and the test result are each associated with the same set of conditions or timepoints. For example, some embodiments may have determined a first predicted SNR using a wireless configuration decision model based on a known RSSI measured at a first timepoint. Some embodiments may then obtain a first known SNR provided in association with the first timepoint and determine a difference between the first predicted SNR and the first known SNR as a first value. Some embodiments may further have determined a second predicted SNR using the wireless configuration decision model based on a second known RSSI measured at a second timepoint. Some embodiments may then obtain a second known SNR provided in association with the second timepoint and determine a difference between the second predicted SNR and the second known SNR as a second value. Some embodiments may then determine a loss function based on the first value and the second value, such as by determining a root of a sum of squares of the first value, the second value, and other values associated with other timepoints. It should be understood that the operations described above can be used to determine a loss function output for any number of sets of inputs for a wireless configuration decision model.

Some embodiments may use a loss function that accounts for whether a parameter is within a confined region of a parameter space. For example, some embodiments may determine whether a first decision parameter is within an interval [−1, +1], where the interval [−1, +1] represents a permitted range for the decision parameter. If the selected parameter has a parameter value beyond the interval, the loss function may be significantly increased such that a loss function output will not satisfy a satisfaction criterion. For example, some embodiments may use a loss function that increases the value of a corresponding loss function output by 100 if a decision parameter exceeds a decision parameter limit corresponding to the decision parameter.

Some embodiments may determine whether the loss function output satisfies a set of criteria, as indicated by block 460. In some embodiments, the set of satisfaction criteria may include a threshold, where satisfying the set of satisfaction criteria may include satisfying the threshold based on the loss function output. Some embodiments may determine a loss function output difference and use the loss function output difference to determine whether a threshold was satisfied, where the loss function output difference may itself be considered a loss function output. For example, some embodiments may determine that a first loss function output is equal to 1.0 after a first iteration of operations described by block 420, 430, and 440 and that a second loss function output is equal to 0.9 after a second iteration of operations described by block 420, 430, and 440. Some embodiments may then determine that a loss function output difference between the two iterations is equal to 0.1, where the loss function output difference may also be considered a loss function output of the second iteration. Some embodiments may determine that a loss function output difference that is less than a threshold satisfies the threshold. For example, some embodiments may have a threshold value equal to 0.01 and may determine that the threshold is satisfied if the loss function output difference is less than 0.01.

As described elsewhere, some embodiments may determine a loss function output based on multiple outcomes after determining multiple outcomes based on a plurality of sets of provided values, where the plurality of sets of provided values may be provided by wireless communication devices. For example, some embodiments may receive 525 sets of wireless statistics, use the 525 sets of wireless statistics to determine an associated set of 525 test results representing actual SNR values. Some embodiments may then determine 525 differences, where each respective difference of the 525 differences is a difference between a test result representing an actual SNR value and a predicted SNR value. Some embodiments may then determine a loss function output based on the 525 differences, such as by determining a sum of the differences, a sum of the squares of the differences, a root of the sum of the squares of the differences, etc. Some embodiments may determine a difference between a first loss function output of a first iteration and a second loss function output of a second iteration, where both loss function outputs are determined based on the 525 test results. Some embodiments may compare the second loss function output to a first threshold and determine that the second loss function output satisfies the first threshold if the second loss function output is less than the first threshold. Alternatively, or additionally, some embodiments may compare the loss function output difference to a second threshold and determine that the loss function output difference satisfies the second threshold if the loss function output difference is less than the second threshold. In some embodiments, the set of criteria to stop further iterations may require that only one threshold be satisfied. Alternatively, some embodiments may require that multiple thresholds be satisfied before determining that a set of criteria permitting a candidate decision model parameter to be assigned as the actual updated set of decision model parameters to then be distributed to wireless communication devices.

In response to a determination that the loss function output satisfies the set of criteria, operations of the process 400 may proceed to operations described by block 480. Otherwise, operations of the process 400 may proceed to block 470.

Some embodiments may update a set of learning model parameters of the machine learning model based on one or more outputs of the set of loss function outputs, as indicated by block 470. Some embodiments may update the set of learning model parameters using a gradient descent method, a simulated annealing method, genetic algorithm, or particle swarm optimization. For example, the machine learning model may include a neural network model, and some embodiments may use a gradient descent method to update the weights of the neural network model by first determining an error based on a difference between a prior loss function output and a current loss function output. Some embodiments may then backpropagate the error through to update a set of weights of the machine learning model and a set of differences between a prior set of learning model parameters and a current set of learning model parameters.

Some embodiments may assign the set of candidate decision model parameters to be an updated set of decision model parameters, as indicated by block 480. After determining that a loss function output has satisfied a set of criteria, some embodiments may indicate that the set of candidate decision model parameters satisfy an accuracy criterion or other criterion. Alternatively, or additionally, some embodiments may assign the set of candidate decision parameters to be an updated set of decision parameters. Some embodiments may then send the updated set of decision parameters to wireless communication devices for configuring the state of one or more wireless connections.

It should be noted that the features and limitations described in any one embodiment may be applied to any other embodiment herein, and a flowchart or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

Figure 5:
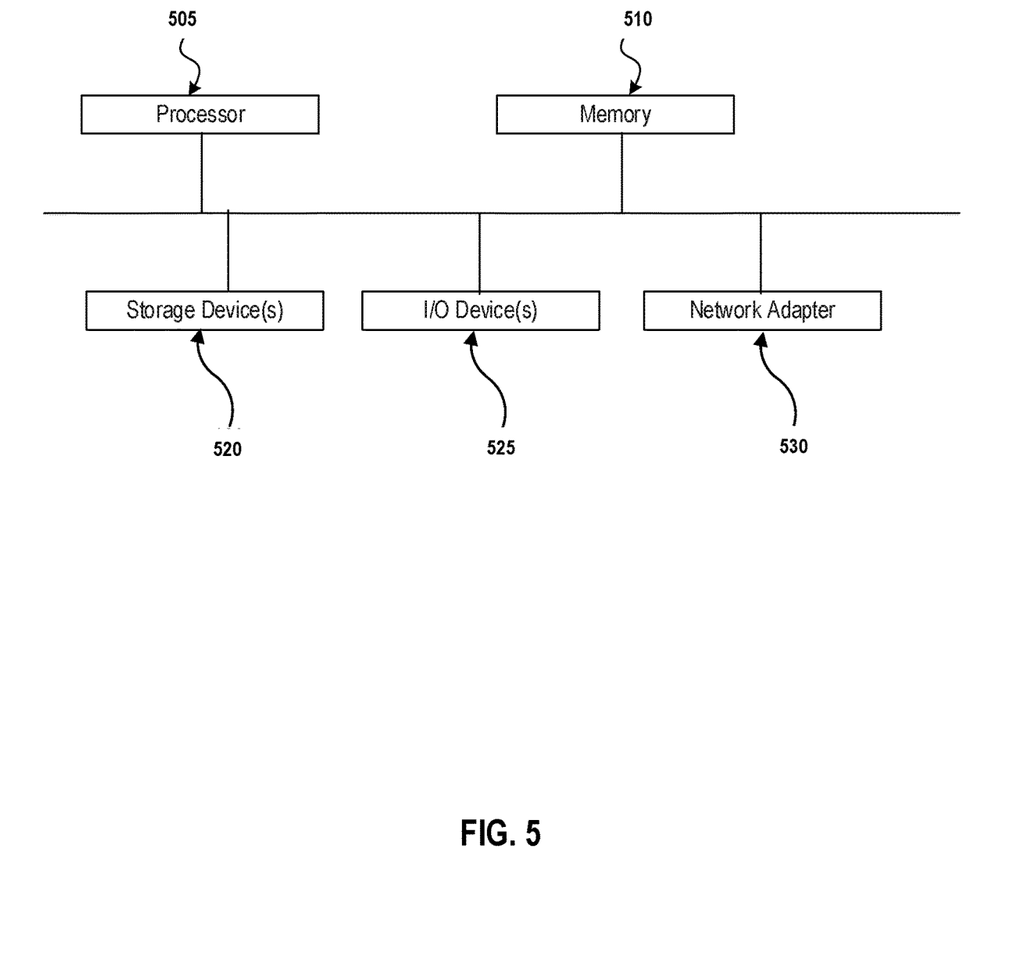
FIG. 5 is a block diagram of a computer system as may be used to implement certain features of some of the embodiments.

FIG. 5 is a block diagram of a computer system as may be used to implement certain features of some of the embodiments. The computer system 500 may include a set of central processing units ("set of processors") 505, memory 510, input/output devices 525 (e.g., keyboard and pointing devices), touch devices, display devices, storage devices 520 (e.g., disk drives), and network adapters 530 (e.g., network interfaces), that are connected to an interconnect 515. The interconnect 515 is illustrated as an abstraction that represents any one or more separate physical buses, point-to-point connections, or both, connected by appropriate bridges, adapters, or controllers. The interconnect 515, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), an IIC (I2C) bus, or an Institute of Electrical and Electronics Engineers (IEEE) standard 1394 bus, also called FireWire.

The memory 510 and storage devices 520 are computer-readable storage media that may store program instructions that implement at least portions of the various embodiments. In addition, the data structures and message structures may be stored or transmitted via a data transmission medium (e.g., a signal on a communications link). Various communications links may be used (e.g., the Internet, a local area network, a wide area network, or a point-to-point dial-up connection). Thus, computer-readable media can include computer-readable storage media (e.g., non-transitory media) and computer-readable transmission media.

In some embodiments, software or firmware may be initially provided to the computer system 500 by downloading it from a remote system through the computer system 500 (e.g., via network adapter 530). The provided software or firmware may be stored in memory 510. The program instructions stored in memory 510 can be implemented as software and/or firmware to program the set of processors 505 to carry out actions described above. For example, some embodiments may use the set of processors 505 to determine a set of decision parameters using a neural network model or another type of machine learning model.

The various embodiments introduced herein can be implemented by, for example, programmable circuitry, e.g., one or more microprocessors, programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

With respect to the components of computer devices described in this disclosure, each of these devices may receive content and data via input/output (hereinafter "I/O") paths. Each of these devices may also include processors and/or control circuitry to send and receive commands, requests, and other suitable data using the I/O paths. The control circuitry may comprise any suitable processing, storage, and/or input/output circuitry. Further, some or all of the computer devices described in this disclosure may include a user input interface and/or user output interface (e.g., a display) for use in receiving and displaying data. In some embodiments, a display such as a touchscreen may also act as a user input interface. It should be noted that in some embodiments, one or more devices described in this disclosure may have neither user input interfaces nor displays and may instead receive and display content using another device (e.g., a dedicated display device such as a computer screen and/or a dedicated input device such as a remote control, mouse, voice input, etc.). Additionally, one or more of the devices described in this disclosure may run an application (or another suitable program) that performs one or more operations described in this disclosure.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment may be combined with one or more features of any other embodiment.

As used throughout this application, the word "may" is used in a permissive sense (i.e., meaning having the potential to), rather than the mandatory sense (i.e., meaning must). The words "include," "including," "includes," and the like mean including, but not limited to. As used throughout this application, the singular forms "a," "an," and "the" include plural referents unless the context clearly indicates otherwise. Thus, for example, reference to "an element" or "an element" includes a combination of two or more elements, notwithstanding use of other terms and phrases for one or more elements, such as "one or more." The term "or" is non-exclusive (i.e., encompassing both "and" and "or"), unless the context clearly indicates otherwise. Terms describing conditional relationships (e.g., "in response to X, Y," "upon X, Y," "if X, Y," "when X, Y," and the like) encompass causal relationships in which the antecedent is a necessary causal condition, the antecedent is a sufficient causal condition, or the antecedent is a contributory causal condition of the consequent (e.g., "state X occurs upon condition Y obtaining" is generic to "X occurs solely upon Y" and "X occurs upon Y and Z"). Such conditional relationships are not limited to consequences that instantly follow the antecedent obtaining, as some consequences may be delayed, and in conditional statements, antecedents are connected to their consequents (e.g., the antecedent is relevant to the likelihood of the consequent occurring). Statements in which a plurality of attributes or functions are mapped to a plurality of objects (e.g., one or more processors performing steps/operations A, B, C, and D) encompass both all such attributes or functions being mapped to all such objects and subsets of the attributes or functions being mapped to subsets of the objects (e.g., both all processors each performing steps/operations A-D, and a case in which processor 1 performs step/operation A, processor 2 performs step/operation B and part of step/operation C, and processor 3 performs part of step/operation C and step/operation D), unless otherwise indicated. Further, unless otherwise indicated, statements that one value or action is "based on" another condition or value encompass both instances in which the condition or value is the sole factor and instances in which the condition or value is one factor among a plurality of factors.

Unless the context clearly indicates otherwise, statements that "each" instance of some collection have some property should not be read to exclude cases where some otherwise identical or similar members of a larger collection do not have the property (i.e., each does not necessarily mean each and every). Limitations as to sequence of recited steps should not be read into the claims unless explicitly specified (e.g., with explicit language like "after performing X, performing Y"), in contrast to statements that might be improperly argued to imply sequence limitations (e.g., "performing X on items, performing Y on the X'ed items") used for purposes of making claims more readable rather than specifying sequence. Statements referring to "at least Z of A, B, and C" and the like (e.g., "at least Z of A, B, or C") refer to at least Z of the listed categories (A, B, and C) and do not require at least Z units in each category. Unless the context clearly indicates otherwise, it is appreciated that throughout this specification discussions utilizing terms such as "processing," "computing," "calculating," "determining," or the like refer to actions or processes of a specific apparatus, such as a special purpose computer or a similar special purpose electronic processing/computing device. Furthermore, unless indicated otherwise, updating an item may include generating the item or modifying an existing time. Thus, updating a record may include generating a record or modifying the value of an already-generated value.

ENUMERATED EMBODIMENTS

The present techniques will be better understood with reference to the following enumerated embodiments:

1. A method for dynamic channel selection by updating a wireless configuration decision model based on test results comprising: obtaining a set of wireless statistics comprising a signal strength value of a wireless communication device; obtaining a set of device usage information comprising an application usage value of the wireless communication device; obtaining a set of hardware-related information comprising antenna usage of the wireless communication device; determining test results of a testbed system based on the set of wireless statistics and the set of hardware-related information by: configuring a set of testbed parameters of the testbed system to mimic hardware and application performance based on the set of hardware-related information and the application usage value; and modifying operations of the testbed system to emulate signal having signal metrics matching the signal strength value; determining a set of decision parameters of a wireless configuration decision model using a machine learning model based on the test results; and sending the set of decision parameters to the wireless communication device, wherein receiving the set of decision parameters causes the wireless communication device to select a channel of a plurality of channels to serve a wireless connection based on the set of decision parameters.

2. The method of embodiment 1, further comprising receiving an initial set of decision parameters that have been used to configure an instance of the wireless configuration decision, wherein modifying operations of the testbed system comprises: modifying a configuration of a testbed parameter of the testbed system; using an instance of the wireless configuration decision model configured with the initial set of decision parameters to determine a wireless configuration parameter based on the modified testbed parameter; and modifying operations of the testbed system based on the wireless configuration parameter.

3. The method of any of embodiments 1 to 2, wherein: the testbed system comprises a testbed transmitting device and a testbed receiving device; the set of testbed parameters comprises a set of transmitting device parameters to control operations of the testbed transmitting device and a set of receiving device parameters to control operations of the testbed receiving device; configuring the set of testbed parameters comprises: updating the set of transmitting device parameters of the testbed transmitting device based on the signal strength value; and updated the set of receiving device parameters based on the set of hardware-related information and the application usage value.

4. The method of any of embodiments 1 to 3, wherein: the signal strength value is a first signal strength value; the application usage value is a first application usage value; obtaining the set of wireless statistics comprises obtaining a obtaining a plurality of signal strength values, wherein each value of the plurality of signal strength values is associated with a different timepoint of a plurality of timepoints, and wherein the plurality of signal strength values comprises the first signal strength value; obtaining the set of device usage information comprises obtaining a plurality of application usage values, wherein each application usage value of the plurality of application usage values is associated with a different timepoint of the plurality of timepoints, and wherein the plurality of application usage values comprises the first application usage value; determining the test results comprises determining a respective test result of the test results for each respective timepoint of the set of timepoints based on a respective signal strength value of the plurality of signal strength values and a respective application usage value of the plurality of application usage values associated with the respective timepoint; and determining the set of decision parameters comprises providing the plurality of test results to the machine learning model to update a previous version of the set of decision parameters.

5. The method of any of embodiments 1 to 4, further comprising: determining an identifier associated with the wireless communication device; and retrieving a first set of learning parameters of the machine learning model based on the identifier, wherein determining the set of decision parameters comprises: determining a modified decision model by configuring the wireless configuration decision model with the first set of learning parameters; and determining a first predicted output using the modified decision model.

6. The method of any of embodiments 1 to 5, wherein using the machine learning model comprises using a neural network to determine the set of decision parameters.

7. A set of non-transitory, machine-readable media storing program instructions that, when executed by a set of processors, causes the processors to perform operations comprising: obtaining a set of wireless statistics of a wireless communication device; obtaining a set of device usage information of the wireless communication device; obtaining a set of hardware-related information of the wireless communication device; determining a set of test results of a testbed system based on the set of wireless statistics and the set of hardware-related information by configuring the testbed system based on the set of wireless statistics, the set of device usage information, and the set of hardware-related information; updating a set of decision parameters of a wireless configuration decision model using a machine learning model based on the set of test results; and sending the updated set of decision parameters to the wireless communication device, wherein the wireless communication device configures a wireless configuration parameter based on an instance of the wireless configuration decision model configured with the updated set of decision parameters.

8. The set of media of embodiment 7, further comprising: retrieving a first set of learning model parameters of the machine learning model from the wireless communication device; and determining an updated set of learning model parameters based on the first set of learning model parameters and the test results.

9. The set of media of any of embodiments 7 to 8, wherein determining the set of decision parameters comprises: determining a first set of candidate decision parameters using the machine learning model; predicting a first outcome based on the set of hardware-related information and a value of the set of wireless statistics using a candidate decision model configured with the first set of candidate decision parameters; determining a first loss function output based on a comparison between the test result and the first outcome; in response to a determination that the first loss function output does not satisfy a threshold, updating learning model parameters of the machine learning model based on a difference between the first outcome and the test result; determining a second set of candidate decision parameters based on the updated learning model parameters of the machine learning model; and predicting a second outcome based on the set of hardware-related information and the value of the set of wireless statistics using the candidate decision model configured with the first set of candidate decision parameters; determining a second loss function output based on a comparison between the test result and the first outcome; in response to a determination that the second loss function output satisfies the threshold, assigning the second set of candidate decision parameters as the set of decision parameters.

10. The set of media of embodiment 9, the operations further comprising obtaining a boundary in a parameter space of the set of decision parameters, wherein determining the first loss function output comprises determining the first loss function output based on the boundary.

11. The set of media of any of embodiments 7 to 10, the operations further comprising: predicting a first plurality of predicted outcomes associated with a plurality of sets of provided values comprising the set of wireless statistics, the set of device usage information, and the set of hardware-related information; determining a first loss function output by: for each respective predicted outcome of the first plurality of predicted outcomes, determining a respective difference of a set of differences based on the respective predicted outcome and a respective test result, wherein the respective difference is a difference between the respective predicted outcome and the respective test result; and determining the first loss function output based on the set of differences; based on a determination that the first loss function output does not satisfy a threshold, updating learning model parameters of the machine learning model based on the set of differences; determining a second set of candidate decision parameters based on the updated learning model parameters of the machine learning model; predicting a second plurality of predicted outcomes based on the set of hardware-related information and the value of the set of wireless statistics using the candidate decision model configured with the second set of candidate decision parameters; determining a second loss function output based on the second plurality of predicted outcomes; and in response to a determination that the second loss function output satisfies the threshold, assigning the second set of candidate decision parameters as the set of decision parameters.

12. The set of media of embodiment 11, wherein each respective set of the plurality of sets of provided values is associated with a different timepoint, and wherein each respective outcome of the first plurality of predicted outcomes is determined based on a respective set of provided values of the plurality of sets of provided values.

13. The set of media of any of embodiments 7 to 12, wherein the machine learning model comprises a deep learning neural network, and wherein the deep learning neural network comprises at least three layers of neural units.

14. The set of media of any of embodiments 7 to 13, wherein the set of hardware-related information comprises a metric of antenna usage, a computing resource type, or a battery capacity.

15. The set of media of any of embodiments 7 to 14, wherein the set of device usage information comprises usage times, and wherein updating the set of decision parameters comprises using a wireless configuration decision to predict an amount of network resources to allocate to an application type based on a time.

16. A system comprising: a set of processors; and a memory storing program instructions that, when executed by the set of processors, causes the set of processors to perform operations comprising: obtaining a set of wireless statistics of a wireless communication device; obtaining a set of hardware-related information of the wireless communication device; determining a set of test results of a testbed system based on the set of wireless statistics and the set of hardware-related information by configuring the testbed system based on the set of wireless statistics and the set of hardware-related information; updating a set of decision parameters of a wireless configuration decision model using a machine learning model based on the set of test results; and sending the updated set of decision parameters to the wireless communication device, wherein the wireless communication device configures a wireless configuration parameter based on an instance of the wireless configuration decision model configured with the updated set of decision parameters.

17. The system of embodiment 16, wherein determining the set of decision parameters comprises predicting a wireless statistic associated with communication between two access points of a mesh network.

18. The system of any of embodiments 16 to 17, wherein the machine learning model comprises a recurrent neural network, and wherein updating the set of decision parameters comprises providing time information associated with the set of wireless statistics to the recurrent neural network.

19. The system of any of embodiments 16 to 18, the operations further comprising retrieving a first set of learning parameters of the machine learning model based on a value provided by the wireless communication device, wherein determining the set of decision parameters comprises: determining a modified decision model by configuring the wireless configuration decision model with the first set of learning parameters; and determining a first predicted output using the modified decision model.

20. The system of any of embodiments 16 to 19, wherein the testbed system comprises a set of simulation applications, and wherein configuring the testbed system comprises configuring parameters of the set of simulation applications.

What is claimed is:

1. A method for dynamic channel selection by updating a wireless configuration decision model based on test results comprising:
    obtaining a set of wireless statistics comprising a signal strength value of a wireless communication device;
    obtaining a set of device usage information comprising an application usage value of the wireless communication device;
    obtaining a set of hardware-related information comprising antenna usage of the wireless communication device;
    determining test results of a testbed system based on the set of wireless statistics and the set of hardware-related information by:
        configuring a set of testbed parameters of the testbed system to mimic hardware and application performance based on the set of hardware-related information and the application usage value; and
        modifying operations of the testbed system to emulate a signal having signal metrics matching the signal strength value;
    determining a set of decision parameters of a wireless configuration decision model using a machine learning model based on the test results; and
    sending the set of decision parameters to the wireless communication device, wherein receiving the set of decision parameters causes the wireless communication device to select a channel of a plurality of channels to use for serving a wireless connection based on the set of decision parameters.

2. The method of claim 1, further comprising receiving an initial set of decision parameters that have been used to configure an instance of the wireless configuration decision, wherein modifying operations of the testbed system comprises:
   modifying a configuration of a testbed parameter of the testbed system;
   using an instance of the wireless configuration decision model configured with the initial set of decision parameters to determine a wireless configuration parameter based on the modified testbed parameter; and
   modifying operations of the testbed system based on the wireless configuration parameter.

3. The method of claim 1, wherein:
   the testbed system comprises a testbed transmitting device and a testbed receiving device;
   the set of testbed parameters comprises a set of transmitting device parameters to control operations of the testbed transmitting device and a set of receiving device parameters to control operations of the testbed receiving device; and
   configuring the set of testbed parameters comprises:
      updating the set of transmitting device parameters of the testbed transmitting device based on the signal strength value; and
      updating the set of receiving device parameters based on the set of hardware-related information and the application usage value.

4. The method of claim 1, wherein:
   the signal strength value is a first signal strength value;
   the application usage value is a first application usage value;
   obtaining the set of wireless statistics comprises obtaining a plurality of signal strength values, wherein each value of the plurality of signal strength values is associated with a different timepoint of a plurality of timepoints, and wherein the plurality of signal strength values comprises the first signal strength value;
   obtaining the set of device usage information comprises obtaining a plurality of application usage values, wherein each application usage value of the plurality of application usage values is associated with a different timepoint of the plurality of timepoints, and wherein the plurality of application usage values comprises the first application usage value;
   determining the test results comprises determining a respective test result of the test results for each respective timepoint of the set of timepoints based on a respective signal strength value of the plurality of signal strength values and a respective application usage value of the plurality of application usage values associated with the respective timepoint; and
   determining the set of decision parameters comprises providing the plurality of test results to the machine learning model to update a previous version of the set of decision parameters.

5. The method of claim 1, further comprising:
   determining an identifier associated with the wireless communication device; and
   retrieving a first set of learning parameters of the machine learning model based on the identifier, wherein determining the set of decision parameters comprises:
      determining a modified decision model by configuring the wireless configuration decision model with the first set of learning parameters; and
      determining a first predicted output using the modified decision model.

6. The method of claim 1, wherein using the machine learning model comprises using a neural network to determine the set of decision parameters.

7. A set of non-transitory, machine-readable media storing program instructions that, when executed by a set of processors, cause the processors to perform operations comprising:
   obtaining a set of wireless statistics of a wireless communication device;
   obtaining a set of device usage information of the wireless communication device;
   obtaining a set of hardware-related information of the wireless communication device;
   determining a set of test results of a testbed system based on the set of wireless statistics and the set of hardware-related information by configuring the testbed system based on the set of wireless statistics, the set of device usage information, and the set of hardware-related information;
   updating a set of decision parameters of a wireless configuration decision model using a machine learning model based on the set of test results; and
   sending the updated set of decision parameters to the wireless communication device, wherein the wireless communication device configures a wireless configuration parameter based on an instance of the wireless configuration decision model configured with the updated set of decision parameters.

8. The set of media of claim 7, further comprising:
   retrieving a first set of learning model parameters of the machine learning model from the wireless communication device; and
   determining an updated set of learning model parameters based on the first set of learning model parameters and the test results.

9. The set of media of claim 7, wherein determining the set of decision parameters comprises:
   determining a first set of candidate decision parameters using the machine learning model;
   predicting a first outcome based on the set of hardware-related information and a value of the set of wireless statistics using a candidate decision model configured with the first set of candidate decision parameters;
   determining a first loss function output based on a comparison between the test result and the first outcome;
   in response to a determination that the first loss function output does not satisfy a threshold, updating learning model parameters of the machine learning model based on a difference between the first outcome and the test result;
   determining a second set of candidate decision parameters based on the updated learning model parameters of the machine learning model;
   predicting a second outcome based on the set of hardware-related information and the value of the set of wireless statistics using the candidate decision model configured with the first set of candidate decision parameters;
   determining a second loss function output based on a comparison between the test result and the first outcome; and in response to a determination that the second loss function output satisfies the threshold, assigning the second set of candidate decision parameters as the set of decision parameters.

10. The set of media of claim 9, the operations further comprising obtaining a boundary in a parameter space of the set of decision parameters, wherein determining the first loss function output comprises determining the first loss function output based on the boundary.

11. The set of media of claim 7, the operations further comprising:
predicting a first plurality of predicted outcomes associated with a plurality of sets of provided values comprising the set of wireless statistics, the set of device usage information, and the set of hardware-related information;
determining a first loss function output by:
for each respective predicted outcome of the first plurality of predicted outcomes, determining a respective difference of a set of differences based on the respective predicted outcome and a respective test result, wherein the respective difference is a difference between the respective predicted outcome and the respective test result; and
determining the first loss function output based on the set of differences;
based on a determination that the first loss function output does not satisfy a threshold, updating learning model parameters of the machine learning model based on the set of differences;
determining a second set of candidate decision parameters based on the updated learning model parameters of the machine learning model;
predicting a second plurality of predicted outcomes based on the set of hardware-related information and the value of the set of wireless statistics using the candidate decision model configured with the second set of candidate decision parameters;
determining a second loss function output based on the second plurality of predicted outcomes; and
in response to a determination that the second loss function output satisfies the threshold, assigning the second set of candidate decision parameters as the set of decision parameters.

12. The set of media of claim 11, wherein each respective set of the plurality of sets of provided values is associated with a different timepoint, and wherein each respective outcome of the first plurality of predicted outcomes is determined based on a respective set of provided values of the plurality of sets of provided values.

13. The set of media of claim 7, wherein the machine learning model comprises a deep learning neural network, and wherein the deep learning neural network comprises at least three layers of neural units.

14. The set of media of claim 7, wherein the set of hardware-related information comprises a metric of antenna usage, a computing resource type, or a battery capacity.

15. The set of media of claim 7, wherein the set of device usage information comprises usage times, and wherein updating the set of decision parameters comprises using a wireless configuration decision to predict an amount of network resources to allocate to an application type based on a time.

16. A system comprising:
a set of processors; and
a memory storing program instructions that, when executed by the set of processors, cause the set of processors to perform operations comprising:
obtaining a set of wireless statistics of a wireless communication device;
obtaining a set of hardware-related information of the wireless communication device;
determining a set of test results of a testbed system based on the set of wireless statistics and the set of hardware-related information by configuring the testbed system based on the set of wireless statistics and the set of hardware-related information;
updating a set of decision parameters of a wireless configuration decision model using a machine learning model based on the set of test results; and
sending the updated set of decision parameters to the wireless communication device, wherein the wireless communication device configures a wireless configuration parameter based on an instance of the wireless configuration decision model configured with the updated set of decision parameters.

17. The system of claim 16, wherein determining the set of decision parameters comprises predicting a wireless statistic associated with communication between two access points of a mesh network.

18. The system of claim 16, wherein the machine learning model comprises a recurrent neural network, and wherein updating the set of decision parameters comprises providing time information associated with the set of wireless statistics to the recurrent neural network.

19. The system of claim 16, the operations further comprising retrieving a first set of learning parameters of the machine learning model based on a value provided by the wireless communication device, wherein determining the set of decision parameters comprises:
determining a modified decision model by configuring the wireless configuration decision model with the first set of learning parameters; and
determining a first predicted output using the modified decision model.

20. The system of claim 16, wherein the testbed system comprises a set of simulation applications, and wherein configuring the testbed system comprises configuring parameters of the set of simulation applications.

* * * * *